(12) United States Patent
Song et al.

(10) Patent No.: US 6,339,667 B1
(45) Date of Patent: Jan. 15, 2002

(54) OPTICAL WAVEGUIDE AND METHOD FOR FABRICATING THE SAME

(75) Inventors: Young-Hui Song; Tae-Hoon Kim; Sun-Tae Jung, all of Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/484,060

(22) Filed: Jan. 18, 2000

(30) Foreign Application Priority Data

Jan. 18, 1999 (KR) .............................................. 99-1261

(51) Int. Cl.[7] ................................................ G02B 6/02
(52) U.S. Cl. ...................... 385/129; 385/144; 385/131; 385/141; 385/14
(58) Field of Search ................................ 385/123–129, 385/131, 141, 144, 145, 14, 130, 132

(56) References Cited

U.S. PATENT DOCUMENTS

| 3,823,995 A | * | 7/1974 | Carpenter ................... 385/124 |
| 4,181,403 A | | 1/1980 | Macedo et al. ............. 385/124 |
| 4,230,396 A | | 10/1980 | Olshansky et al. ......... 385/124 |
| 4,248,614 A | | 2/1981 | Scherer ....................... 65/405 |
| 4,306,767 A | * | 12/1981 | Kawachi et al. ............ 385/127 |
| 4,339,174 A | | 7/1982 | Levin .......................... 385/142 |
| 4,610,506 A | * | 9/1986 | Tokunaga et al. ........... 385/128 |
| 4,712,855 A | * | 12/1987 | Tolksdorf et al. ........... 385/129 |
| 4,852,968 A | | 8/1989 | Reed ........................... 385/127 |
| 4,893,896 A | * | 1/1990 | Tanaka et al. .............. 385/124 |
| 4,944,838 A | | 7/1990 | Koch et al. ................. 438/751 |
| 5,206,925 A | * | 4/1993 | Nakazawa et al. .......... 385/142 |
| 5,416,884 A | | 5/1995 | Hirata et al. ................. 385/142 |
| 5,913,005 A | | 6/1999 | Terasawa et al. ........... 385/127 |
| 5,956,448 A | | 9/1999 | Smolka et al. .............. 385/124 |
| 5,993,899 A | * | 11/1999 | Robin et al. ................ 427/163 |

OTHER PUBLICATIONS

Stewart E. Miller et al., "Optical Fiber Telecommunications", Academic Press, Inc. pp46–47.

* cited by examiner

Primary Examiner—Brian Healy
Assistant Examiner—Scott Knauss
(74) Attorney, Agent, or Firm—Robert E. Bushnell, Esq.

(57) ABSTRACT

Disclosed is an optical waveguide having a specific dopant distribution capable of reducing a deformation thereof and existence of residual stresses therein, thereby involving no birefrigence. A method for fabricating the optical waveguide is also disclosed. The optical waveguide includes a substrate, a lower clad layer doped with a dopant in a content varying continuously in a thickness direction of the lower clad layer, so that the lower clad layer exhibits a refractive index distribution varying in the thickness direction thereof, and a core layer formed over the lower clad layer.

22 Claims, 1 Drawing Sheet

OPTICAL WAVEGUIDE AND METHOD FOR FABRICATING THE SAME

CLAIM OF PRIORITY

This application makes reference to, incorporates the same herein, and claims all benefits accruing under 35 U.S.C. §119 from my application OPTICAL WAVEGUIDE AND METHOD FOR FABRICATING THE SAME filed with the Korean Industrial Property Office on Jan. 18, 1999 and there duly assigned Ser. No. 1261/1999.

FIELD OF THE INVENTION

The present invention relates to an optical waveguide, and more particularly to an optical waveguide having a specific dopant distribution capable of reducing a deformation thereof and existence of residual stresses therein, thereby involving no birefrigence. The present invention also relates to a method for fabricating such an optical waveguide.

DESCRIPTION OF THE PRIOR ART

Optical waveguides are transmission paths adapted to propagate optical waves in a longitudinal direction while confining those optical waves within a certain cross section, thereby reducing propagation losses of the optical waves. Typically, such an optical waveguide includes a core, and a clad exhibiting a refractive index lower than that of the core.

In order to fabricate such an optical waveguide, a flame hydrolysis deposition method is most commonly used in which a lower clad layer, a core layer, and an upper clad layer are sequentially formed over a substrate.

In accordance with the flame hydrolysis deposition method, a soot is deposited over a substrate by oxidizing and hydrolyzing a chemical substance such as $SiCl_4$, $GeCl_4$, $POCl_3$, $BCl_3$ or the like using oxygen and hydrogen flames. The deposited soot is then sintered at a high temperature in a sintering furnace to obtain a transparent silica film.

In order to reduce such an induced birefringence, a variety of methods have been proposed. One method is to form an asymmetric stress-releasing groove. Another method is to deposit a stress applying member on a clad thin film. Another method has been proposed in which a buffer layer is interposed between a substrate and a lower clad layer.

The first method should use an etching process whereas the second method requires formation of an additional stress applying layer made of silicon or $Si_4N_4$ over the entire portion of the clad thin film or on an intermediate portion of the clad thin film. In the case using a buffer layer, processes for depositing and sintering the buffer layer should be used. Due to such processes, the processing time is lengthened, thereby resulting in an increase in the production costs.

U.S. Pat. No. 4,339,174 for a High Bandwidth Optical Waveguide to Levin discloses an optical waveguide having a cladding layer, a core layer, and a barrier layer disposed between the core and the cladding. Dashed line 16 in FIG. 1 shows $B_2O_3$ concentration being graded from the barrier layer level to zero at a radius $r_d$. U.S. Pat. No. 4,248,614 for a Method For Drawing High-Bandwidth Optical Waveguides to Scherer and U.S. Pat. No. 4,181,403 for an Optical Fiber With Compression Surface Layer to Macedo et al and U.S. Pat. No. 4,230,396 for a High Bandwidth Optical Waveguide And Method of Fabrication to Olshansky et al disclose waveguides where the refractive index and dopant concentration vary within the waveguide. However, I have noticed that these references do not disclose buffer layers within the waveguide. In addition, these references pertain only to optical waveguides of a circular cross section. What is needed is an optical waveguide with a rectangular cross section that contains buffer layers that varies the dopant concentration in a stepwise and a linear fashion.

SUMMARY OF THE INVENTION

Therefore, an object of the invention is to provide an optical waveguide including a lower clad layer formed over a silicon substrate while being doped with a dopant to reduce a thermal expansion coefficient difference between the silicon substrate and the lower clad layer and to reduce the glassification temperature of the lower clad layer, thereby preventing the silicon substrate from being deformed and reducing existence of residual stresses.

Another object of the invention is to provide a method for fabricating the optical waveguide.

It is yet another object to provide a waveguide having buffer layers.

It is still another object to provide a waveguide having a rectangular cross section.

It is still yet another object to provide an optical waveguide with a rectangular cross section and to decrease polarization dependent loss (PDL) owing to the rectangular shape of the waveguide.

In accordance with one aspect, the present invention provides an optical waveguide comprising: a substrate; a lower clad layer doped with a dopant in a content varying continuously in a thickness direction of the lower clad layer, so that the lower clad layer exhibits a refractive index distribution varying in the thickness direction thereof; and a core layer formed over the lower clad layer.

In accordance with another aspect, the present invention provides a method for fabricating an optical waveguide comprising the steps of: (a) depositing a lower clad layer over a substrate while continuously varying a dosage of a dopant to be doped in the lower clad layer in such a fashion that the lower clad layer exhibits a refractive index distribution varying in the thickness direction thereof; and (b) forming a core layer over the lower clad layer.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
FIG. 1 is a cross-sectional view illustrating a state in which a silicon substrate used to fabricate an optical waveguide in accordance with a conventional method is deformed due to a thermal expansion coefficient difference between the silicon substrate and a lower clad layer formed over the silicon substrate and a glassification temperature for the lower clad layer.

FIG. 1 illustrates a state in which a silicon substrate used to fabricate an optical waveguide in accordance with a conventional method is deformed due to a thermal expansion coefficient difference between the silicon substrate and a lower clad layer formed over the silicon substrate and a glassification temperature for the lower clad layer.

Typically, the silicon substrate 110 exhibits a thermal expansion coefficient higher than that of the lower clad layer 120 formed thereon. Due to such a thermal expansion coefficient difference, the silicon substrate 110 and lower clad layer 120 are deformed during the process in which the lower clad layer 120 is cooled after being sintered at a high temperature, as shown in FIG. 1. Where a core layer 130 is formed over the substrate 110 deformed as mentioned above, it is also deformed due to the deformation of the substrate 110. Furthermore, residual stresses are left in the core layer 130. Due to the deformation of the core layer 130, a non-uniform waveguide pattern may be formed in a photolithography process. Also, the residual stresses existing in the core layer 130 causes an induced birefringence resulting in a variation in the waveguide path for an optical signal between a transverse electric (TE) polarization mode and a transverse magnetic (TM) polarization mode. As a result, the resultant output optical signal may be distorted.

Figure 2:
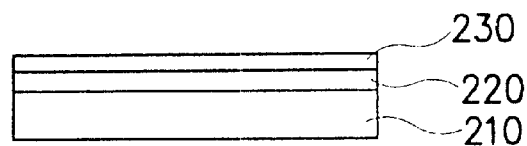
FIG. 2 is a cross-sectional view illustrating an optical waveguide according to the present invention.

FIG. 2 is a cross-sectional view illustrating an optical waveguide according to the present invention. As shown in FIG. 2, the optical waveguide includes a substrate 210, a lower clad layer 220 deposited over the substrate 210, and a core layer 230 deposited over the lower clad layer 220.

In accordance with the present invention, the lower clad layer 220 is deposited over the substrate 210 while being doped with a dopant in such a fashion that the content of the dopant varies continuously in the thickness direction of the lower clad layer 220, thereby causing the lower clad layer 220 to have a refractive index varying in the thickness direction thereof. The lower clad layer 220 has a maximum dopant content at a lower portion thereof while having a reduced dopant content at an upper portion thereof in such a fashion that it has a desired refractive index difference from the core layer 230. Alternatively, the deposition of the lower clad layer 220 may be conducted at a plurality of deposition steps in such a fashion that the content of the dopant is gradually reduced toward the later one of the deposition steps while being uniform at each deposition step. In this case, the lower clad layer 220 includes a plurality of buffer layers having different dopant contents in such a fashion that the dopant content in each buffer layer is uniform in the thickness direction of the buffer layer. The core layer 230 is formed over the lower clad layer 220 having the above mentioned structure.

Buffer layers are different from barrier layers in several respects. The content of the impurities (Phosphorus and Boron) in the buffer layer varies continuously or stepwise (more than two steps) with the distance from the substrate while the content of the inpurity in the barrier layer is uniform and has no relation with the distance from the center of an optical fiber. (See FIG. 3). Further, the buffer layer of the present invention can give the advantage of minimizing the shape change and remaining stress of the substrate and decreases the difference of the thermal expansion coefficient between the substrate and the lower clad layer and the difference between the glass transition temperature of the clad layer and the atmospheric temperature by virtue of the buffer layer being deposited on the plate-looking substrate while a barrier layer is deposited on the clad layer and prevents the interface scattering and absorption losses caused by the direct interface of the core layer and the buffer layer. Accordingly, the functions of the buffer layer and the barrier layer are different from each other.

It is known that a birefringence exhibited in an optical waveguide including a substrate and a lower clad layer formed over the substrate is proportional to a thermal expansion coefficient difference between the substrate and lower clad layer and to a difference between the glassification temperature of the lower clad layer and ambient temperature, as expressed by the following Expression 1:

$$B = C \times \Delta\alpha \times \Delta T \quad \text{[Expression 1]}$$

where, "B" represents the birefringence, "C" represents a constant, "$\Delta\alpha$" represents the thermal expansion coefficient difference between the substrate and lower clad layer, and "$\Delta T$" represents the difference between the glassification temperature of the lower clad layer and ambient temperature.

As the dosage of the dopant used in the deposition process for depositing the lower clad layer 220 increases, the resultant lower clad layer exhibits an increased thermal expansion coefficient, so that it exhibits a reduced thermal expansion coefficient difference from the silicon substrate 210. The lower clad layer 220 also exhibits a lowered glassification temperature, so that the difference between the glassification temperature and ambient temperature, $\Delta T$, is reduced. Accordingly, when an increased dosage of the dopant is used at the initial state of the deposition process, it is possible to minimize a deformation of the silicon substrate 210 and an existence of residual stresses during the deposition of the lower clad layer 220. The lower clad layer 220 should also exhibit a reduced refractive index at a portion thereof adjacent to the core layer 230, as compared to that of the remaining portion thereof, so that it exhibits a desired refractive index difference from the core layer 230 at the portion thereof adjacent to the core layer 230. To this end, a reduced dosage of the dopant is used at the last stage of the deposition process. This method does not require deposition of any separate buffer layer or use of any sintering process because the lower clad layer 220 can serve as a buffer layer. In accordance with this method, therefore, there is an advantage in that no increase in the manufacturing costs is involved.

The deposition of the lower clad layer 220 is achieved by depositing soot layers over the silicon substrate 210 at a plurality of deposition steps using oxygen and hydrogen torches, respectively, while adjusting the dosage of the dopant used at each deposition step to allow the resulting structure to have a desired refractive index distribution in the thickness direction thereof, and then sintering the resulting structure in a sintering furnace.

When the content of the dopant in the lower clad layer 220 increases, the thermal expansion coefficient difference of the lower clad layer 220 increases, thereby causing the thermal expansion coefficient difference between the silicon substrate 210 and lower clad layer 220 to be reduced. This results in a minimized deformation of the silicon substrate 210 occurring during the deposition of the lower clad layer 220. Accordingly, the resultant optical waveguide can exhibit a reduced birefrigence. Also, an increased dopant content in the lower clad layer 220 causes a decrease in the glassification temperature of the lower clad layer 220. This results in a decrease in the difference between the glassification temperature of the lower clad layer 220 and ambient temperature, $\Delta T$. Consequently, the resultant optical waveguide can exhibit a minimum birefrigence.

To this end, in accordance with the present invention, the deposition of the lower clad layer 220 is carried out under the condition in which the dosage of a dopant, such as $BCl_3$ or $POCl_3$, to be doped in the lower clad layer 220 increases at the initial stage of the deposition process in order to increase the content of the dopant in the lower clad layer 220. In order to allow the lower clad layer 220 to exhibit a desired refractive index difference from the core layer 230 at a portion thereof adjacent to the core layer 230, the dosage of the dopant is adjusted during the deposition process.

That is, in accordance with the present invention, the lower clad layer 220 has a desired composition distribution in the thickness direction thereof in such a fashion that it has an increased dopant content at the lower portion thereof to reduce its thermal expansion coefficient difference from the silicon substrate 210 and the difference between its glassification temperature and ambient temperature while having a gradually decreased dopant content toward an upper portion thereof to obtain a desired refractive index difference from the core layer 230 at a portion thereof adjacent to the core layer 230.

Figure 3:
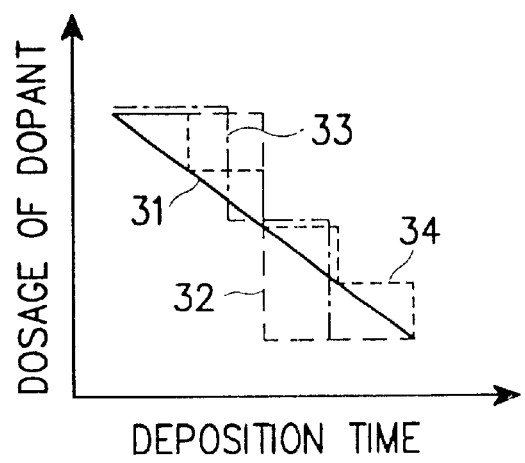
FIG. 3 is a graph depicting a relation between the dosage of the dopant used in accordance with the present invention and the deposition time.

FIG. 3 illustrates a variation in the dosage of the dopant used during the deposition of the lower clad layer 220. In FIG. 3, the graph 31 corresponds to the case in which the dosage of the dopant is continuously varied during the deposition of the lower clad layer 220. The graph 32 of FIG. 3 corresponds to the case in which the dosage of the dopant is varied once during the deposition of the lower clad layer 220 to conduct two deposition steps using different dopant dosages, thereby causing the lower clad layer 220 to have a double-layer structure including one buffer layer. The graphs 33 and 34 of FIG. 3 correspond to the cases in which the dosage of the dopant is varied two and three times during the deposition of the lower clad layer 220, respectively, to conduct a plurality of deposition steps using different dopant dosages, thereby causing the lower clad layer 220 to have a multi-layer structure including several buffer layers. It is also possible to manufacture a lower clad layer 220 having both buffer layers containing uniform concentrations of dopants between certain distances from the silicon substrate 210 and portions of lower clad layer 220 having a continuous distribution of concentration of dopants that varies with distance from silicon substrate 210. These continuous distributions of concentration versus thickness may be linear or non-linear.

The lower clad layer 220 formed in the above mentioned fashion according to the present invention exhibits a high thermal expansion coefficient and a low Classification temperature at a portion thereof adjacent to the silicon substrate 210, that is, a portion thereof formed at the initial stage of the deposition process while exhibiting a low thermal expansion coefficient and a high glassification temperature at a portion thereof adjacent to the core layer 230, that is, a portion thereof formed at the last stage of the deposition process by virtue of a reduced dopant content in the latter portion. Where the dosage content in the lower clad layer 220 is adjusted using phosphorous, the lower clad layer 220 has a refractive index distribution in the thickness direction thereof in such a fashion that its refractive index decreases from its lower portion to its upper portion. On the other hand, where boron is used to adjust the dosage content in the lower clad layer 220, the lower clad layer 220 has a refractive index distribution in the thickness direction thereof in such a fashion that its refractive index increases from its lower portion to its upper portion. Of course, the adjustment of the dosage content in the lower clad layer 220 in either case is achieved in so far as the lower clad layer 220 exhibits a desired refractive index difference from the core layer 230 at the upper portion thereof As apparent from the above description, in accordance with the present invention, the deposition of the lower clad layer is carried out under the condition in which the dosage of a dopant to be doped in the lower clad layer increases at the initial stage of the deposition process in order to increase the content of the dopant in the portion of the lower clad layer adjacent to the silicon substrate. Accordingly, the lower clad layer exhibits a reduced thermal expansion coefficient difference from the silicon substrate and a reduced difference between its glassification temperature and ambient temperature. As a result, it is possible to prevent the silicon substrate from being deformed during the deposition of the lower clad layer while minimizing existence of residual stresses. Thus, the resultant optical waveguide does not exhibit any induced birefrigence.

In addition, the lower clad layer has a desired composition distribution in the thickness direction thereof by virtue of a dopant dosage adjustment conducted during the deposition of the lower clad layer in accordance with the present invention. Accordingly, there is an advantage in that no deposition of any separate buffer layer or use of any sintering process is required, as compared to conventional methods involving deposition of a separate buffer layer.

While the present invention has been particularly shown and described with reference to a particular embodiment thereof, it will be understood by those skilled in the art that various changes in form and detail may be effected therein without departing away from the scope of the invention as defined by the appended claims.

What is claimed is:

1. An optical waveguide, comprising:
   a substrate;
   a lower clad layer doped with a dopant in a content varying continuously in a thickness direction of the lower clad layer, so that the lower clad layer exhibits a refractive index distribution varying in the thickness direction thereof; and
   a core layer formed over the lower clad layer, the lower clad layer has a multi-layer structure including buffer layers having different dopant contents in such a fashion that the dopant content in each of the buffer layers is uniform in the thickness direction of the buffer layer.

2. The optical waveguide of claim 1, said optical waveguide having a rectangular cross section.

3. A optical waveguide of claim 1, wherein the dopant is phosphorus, so that the lower clad layer has a refractive index distribution in such a fashion that it exhibits a refractive index decreasing from a lower portion thereof to an upper portion thereof.

4. A optical waveguide of claim 1, wherein the dopant is boron, so that the lower clad layer has a refractive index distribution in such a fashion that it exhibits a refractive index increasing from a lower portion thereof to an upper portion thereof.

5. A method for fabricating an optical waveguide comprising the steps of:
   depositing a lower clad layer over a substrate while continuously varying a dosage of a dopant to be doped in the lower clad layer in such a fashion that the lower clad layer exhibits a refractive index distribution varying in the thickness direction thereof; and
   forming a core layer over the lower clad layer.

6. The method of claim 5, the step of depositing said lower clad layer is carried out using an increased dosage of the dopant at an initial stage of the deposition of the lower clad layer while using a reduced dosage of the dopant at a last stage of the deposition of the lower clad layer.

7. The method of claim 5, the step of depositing said lower clad layer is carried out at a plurality of deposition steps while gradually varying the dosage of the dopant, so that the lower clad layer has a multi-layer structure including a plurality of buffer layers.

8. The method of claim 7, said waveguide having a rectangular cross section.

9. An planar optical waveguide, comprising:
   a semiconductor substrate having a rectangular cross section;
   a clad layer formed over the semiconductor substrate and doped with a dopant with a concentration varying in a thickness direction of the clad layer, so that the clad layer has a dopant concentration distribution in such a fashion that it exhibits a dopant concentration decreasing from a lower portion near said semiconductor substrate to an upper portion thereof; and
   a core layer formed over said upper portion of said clad layer.

10. The waveguide of claim 9, the clad layer has a multi-layer structure comprising buffer layers having different dopant concentrations in such a fashion that the dopant concentration in each of the buffer layers is uniform in the thickness direction of the buffer layer.

11. The optical waveguide of claim 9, wherein the dopant concentration varies continuously in said clad layer with respect to a distance from said semiconductor substrate.

12. The optical waveguide of claim 11, wherein the only dopant is phosphorus, so that the clad layer has a refractive index distribution in such a fashion that it exhibits a refractive index decreasing from said lower portion of said clad layer to said upper portion of said clad layer.

13. The optical waveguide of claim 11, wherein the only dopant is boron, so that said clad layer has a refractive index distribution in such a fashion that it exhibits a refractive index increasing from said lower portion of said clad layer to said upper portion of said clad layer.

14. A method for fabricating a planar optical waveguide, comprising the steps of:
   depositing a clad layer over a semiconductor substrate having a rectangular cross section while varying a dosage of a dopant to be doped in the clad layer in such a fashion that the clad layer has a dopant content distribution in such a fashion that said dopant content distribution decreases from a lower portion near said semiconductor substrate to an upper portion thereof; and
   forming a core layer over said upper portion of said clad layer.

15. The method of claim 14, wherein said step of depositing said clad layer is carried out at a plurality of deposition steps while gradually varying the dosage of the dopant, so that said clad layer has a multi-layer structure including a plurality of buffer layers.

16. The method of claim 14, wherein said step of depositing said clad layer is carried out at a continuum of deposition steps while gradually varying the dosage of the dopant, so that said clad layer has a concentration of dopants that vary continuously with distance from said semiconductor substrate.

17. The method of claim 14, wherein said step of depositing said clad layer is carried out at a continuum deposition steps while gradually varying the dosage of the dopant, so that said clad layer has a concentration of dopants that vary linearly with distance from said semiconductor substrate.

18. The optical waveguide of claim 9, wherein the dopant concentration in said clad layer varies linearly with respect to distance from said semiconductor substrate.

19. The optical waveguide of claim 9, wherein the only dopant is phosphorus, so that the clad layer has a refractive index distribution in such a fashion that it exhibits a refractive index decreasing from said lower portion of said clad layer to said upper portion of said clad layer.

20. The optical waveguide of claim 9, wherein the only dopant is boron, so that said clad layer has a refractive index distribution in such a fashion that it exhibits a refractive index increasing from said lower portion of said clad layer to said upper portion of said clad layer.

21. The optical waveguide of claim 10, wherein the only dopant is phosphorus, so that the clad layer has a refractive index distribution in such a fashion that it exhibits a refractive index decreasing from said lower portion of said clad layer to said upper portion of said clad layer.

22. The optical waveguide of claim 10, wherein the only dopant is boron, so that said clad layer has a refractive index distribution in such a fashion that it exhibits a refractive index increasing from said lower portion of said clad layer to said upper portion of said clad layer.

* * * * *